(12) United States Patent
Cast

(10) Patent No.: US 7,515,903 B1
(45) Date of Patent: Apr. 7, 2009

(54) SPEECH TO MESSAGE PROCESSING

(75) Inventor: Thomas Cast, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 532 days.

(21) Appl. No.: 10/282,909

(22) Filed: Oct. 28, 2002

(51) Int. Cl.
H04M 3/42 (2006.01)
(52) U.S. Cl. .................................. 455/413; 455/414.1
(58) Field of Classification Search ............... 455/412.1, 455/412.2, 413, 414.1; 379/88.01–88.05
See application file for complete search history.

(56) References Cited

U.S. PATENT DOCUMENTS

| | | | |
|---|---|---|---|
| 4,744,050 A | 5/1988 | Hirosawa et al. | |
| 5,838,973 A | 11/1998 | Carpenter-Smith et al. | |
| 6,188,909 B1 | 2/2001 | Alanara et al. | |
| 6,279,018 B1* | 8/2001 | Kudrolli et al. | 715/540 |
| 6,313,787 B1 | 11/2001 | King et al. | |
| 6,333,973 B1* | 12/2001 | Smith et al. | 379/88.12 |
| 6,606,373 B1* | 8/2003 | Martin | 379/88.01 |
| 6,690,942 B2 | 2/2004 | Vikman et al. | |
| 6,748,450 B1 | 6/2004 | Dutta | |
| 6,751,209 B1 | 6/2004 | Hamiti et al. | |
| 6,834,312 B2 | 12/2004 | Edwards et al. | |
| 2001/0021936 A1 | 9/2001 | Bertram | |
| 2002/0091500 A1 | 7/2002 | Sakaguchi | |
| 2002/0146097 A1* | 10/2002 | Vuori | 379/88.22 |
| 2002/0160757 A1* | 10/2002 | Shavit et al. | 455/414 |
| 2002/0184270 A1 | 12/2002 | Gimson | |
| 2003/0003931 A1 | 1/2003 | Silventoinen et al. | |
| 2003/0107588 A1 | 6/2003 | Elsbree et al. | |
| 2003/0171870 A1 | 9/2003 | Gueziec | |
| 2003/0233422 A1* | 12/2003 | Csaszar et al. | 709/206 |
| 2004/0205668 A1 | 10/2004 | Eastlake | |

OTHER PUBLICATIONS

Standardization of Applicant Names, EPO PD 0.4 Manual, pp. 1-29 (1992), no month listed.
Kohavi et al., "Emerging Trends in Business Analytics," Communications of the ACM, 45:45-48 (Aug. 2002).

* cited by examiner

Primary Examiner—Sam Bhattacharya
(74) Attorney, Agent, or Firm—Davis Wright Tremaine LLP; Michael J. Donohue; Heather M. Colburn

(57) ABSTRACT

Voice message processors are configured to produce text representations of voice messages. The text representations can be compacted based on one or more abbreviation libraries or rule libraries. Abbreviation processing can be applied to produce a compact text representation based on display properties of a destination device or to enhance user perception. Text representation length can be reduced based on abbreviations in a standard abbreviation list, a user specific abbreviation list, or a combination of standard and custom lists. In some examples, text length is shortened based on stored rules. Mobile stations are configured to receive text representations of voice messages and request delivery of the associated voice messages based on message identifiers or message availability indicators that are presented on mobile station display. Network elements comprise a voice message processor and are configured to produce text representations and deliver text representation or voice messages based as requested by message recipients.

22 Claims, 5 Drawing Sheets

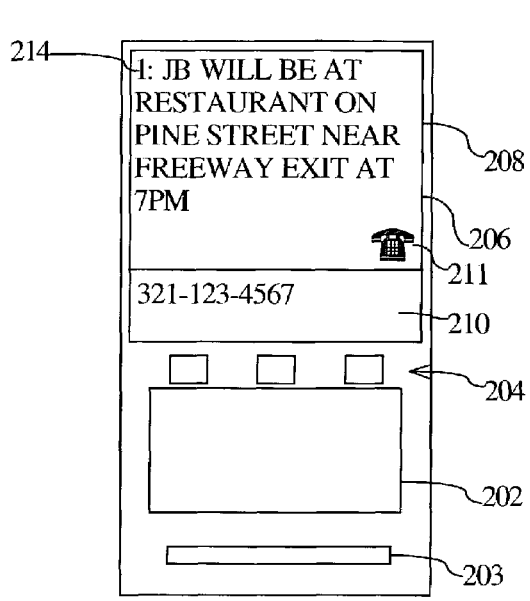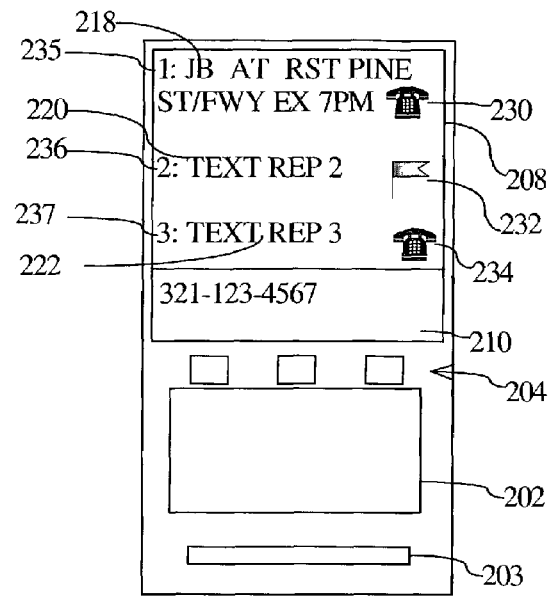
FIG. 2A  FIG. 2B
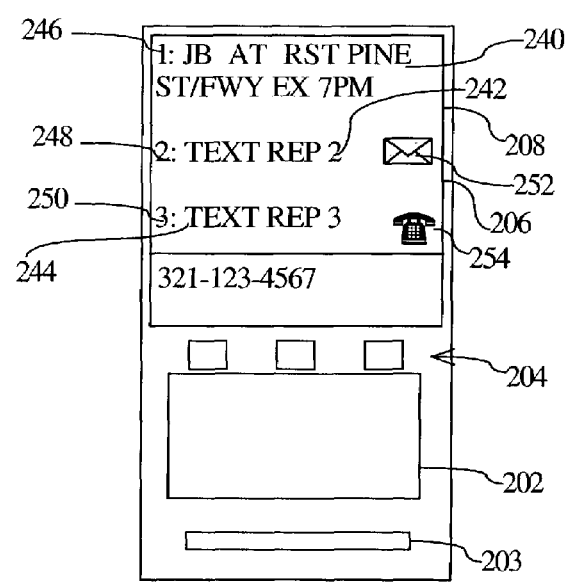
FIG. 2C

SPEECH TO MESSAGE PROCESSING

TECHNICAL FIELD

The disclosure pertains to methods and apparatus for producing and delivering text representations of voice messages.

BACKGROUND

Many wireless and landline telephone system users take advantage of voice messaging or voice mail capabilities. Using voice messaging, a user can leave a voice message for an unavailable message recipient, so that the user need not continue to try and contact the message recipient. Such systems are convenient, as repeated attempts to contact one or more message recipients can be avoided. Such systems are equally convenient for message recipients as messages can be received even when the message recipient is otherwise occupied. Received messages can be played back subsequently as the message recipient's schedule permits. As a result, a message sender and a message recipient can communicate by voice messaging without being simultaneously available.

While voice messaging systems are convenient, they exhibit several difficulties. A message recipient typically is generally unaware of the nature of received voice messages without listening to the messages. In some systems, message duration and message origin are available, but message content is generally unknown. In addition, if the message recipient notes that messages have been received but defers listening to the messages, important, time sensitive messages may not be listened to in time for an appropriate response. Thus, while deferring a review of voice messages prevents message recipient interruption, such deferred review can be too late.

Thus, improved methods an apparatus are needed for voice message delivery.

SUMMARY

Voice message processors include an input configured to receive a voice message and a speech signal processor configured to produce a text representation associated with the voice message. An output is configured to deliver the text representation. In representative examples, the speech signal processor is configured to produce a compact text representation that is based on an abbreviation library or a rule library that can be stored in a memory. In additional examples, the speech signal processor is configured to assign a voice message identifier that is delivered to the output.

Mobile stations comprise a message input configured to receive a text representation of a voice message and an identifier associated with the text representation. A display is configured to display the text representation. In some examples, the mobile stations comprise a transceiver configured to transmit a request for delivery of the voice message associated with the text representation. In other examples, the mobile stations comprise a transceiver configured to transmit a request for delivery of a compact text representation of the voice message. In other representative examples, the message input is configured to receive a message identifier associated with an availability of a voice message and the display is configured to display a display icon associated with the availability of the voice message. In additional examples, a transceiver is configured to deliver a subscriber profile associated with delivery of a text representation of a voice message. In other examples, a memory is configured to store the text representation. In other examples, the mobile station includes an input key configured to transmit a request for delivery of the voice message associated with the text representation.

Mobile stations comprise a message input configured to receive a compact text representation and a voice message identifier. A display is configured to display the compact text representation and an indicator associated with an availability of an associated voice message. In other representative examples, the mobile stations comprise a transmitter configured to transmit a request for delivery of a full text representation associated with the compact text representation. In other examples, the mobile stations comprise a transmitter configured to transmit a request for delivery of a voice message associated with the voice message identifier.

Mobile stations comprise a receiver configured to receive a text representation of a voice message and a transmitter configured to transmit a request for the voice message associated with the text representation. In additional examples, the mobile stations comprise a display configured to exhibit a voice message availability indicator associated with the text representation. In other examples, the mobile stations comprise a processor configured to produce a compact representation of the voice message based on the received text representation. In additional examples, the mobile stations comprise a memory configured to store at least one abbreviation parameter, wherein the processor is configured to compact the text representation based on the at least one abbreviation parameter. In representative examples, the abbreviation parameter is associated with a user identity or an equipment identity. In additional examples, the processor is configured to automatically produce a compact text representation. In other examples, the processor is configured to produce the compact text representation based on one or more text abbreviations stored in an abbreviation library or on one or more abbreviation rules stored in a rule library.

Network elements comprise a receiver configured to receive a voice message and a processor configured to produce an associated text representation. In some examples, the processor is configured to produce the text representation based on one or more abbreviation parameters. In other examples, the processor is configured to receive at least one abbreviation parameter from a mobile station or a network element. In additional examples, the processor is configured to receive at least one abbreviation parameter associated with a message recipient identity or an equipment identity.

Voice message processors comprise means for receiving a voice message and means for processing the voice message to produce an associated text representation. In additional examples, the processors include means for selecting an abbreviation extent for the compact text representation.

Messaging methods comprise preparing a voice message, producing a text representation of the voice message, and transmitting the text representation to a message recipient. In illustrative examples, the methods comprise producing a compact text representation of the voice message based on an abbreviation library. In additional examples, a message sender and the message recipient share the abbreviation library.

Voice message processing methods comprise receiving a voice message, producing a text representation of the voice message, and delivering the text representation to a message recipient. In representative examples, a compact text representation of the voice message is produced based on an abbreviation library and/or a rule library. In other examples, the text representation is abbreviated based on an available display area. In additional examples, the voice message and the text representation are stored. According to other examples, a computer readable medium is configured to comprise computer-executable instructions for performing such voice message processing methods.

In a computer system having a graphical user interface including a display and a user interface selection device, methods are provided that comprise retrieving a menu entry associated with a voice message processor function associated with production of a text representation of a voice message. The menu entry is displayed and a menu selection signal is received that is indicative of the user interface selection device pointing at the menu entry on the display. A voice message processor function associated with the menu entry is performed. In some examples, the voice message processor function is toggling between display of a full text representation and display of associated compact text representation. In other examples, a computer readable medium is provided having computer executable instructions for performing such steps.

These and other features are set forth below with reference to the accompanying drawings.

BRIEF DESCRIPTION OF THE DRAWINGS

FIGS. 2A-2C are schematic diagram illustrating mobile stations configured to display text representations of voice messages.

DETAILED DESCRIPTION

Figure 1A:
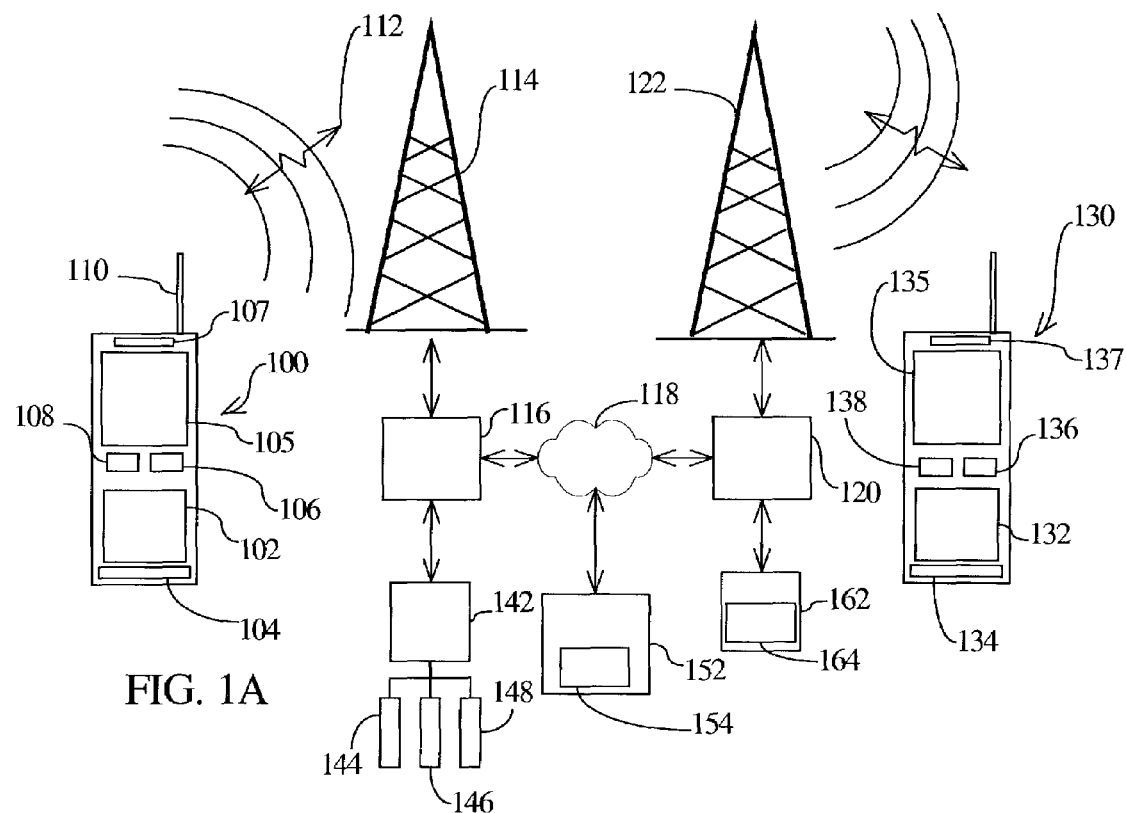
FIG. 1A is a schematic diagram illustrating a communication system that provides voice message processing configured to produce text representations of voice messages.

With reference to FIG. 1A, a mobile station 100 includes a keypad 102 and a microphone 104 configured to receive input from a mobile station user, and a display 105 configured to show user inputs, messages, or other information. Other or additional input devices can also be included with the mobile station 100. The keypad 102, the microphone 104, or both are configured to communicate user inputs to a message processor 106 that is in communication with a transceiver 108. The mobile station 100 also includes an audio output 107 in communication with the transceiver 108. The transceiver 108 produces a modulated radio-frequency signal that is delivered to an antenna 110 for transmission via an air interface 112 to a mobile base station 114. The mobile base station 114 is in communication with a wireless communication network 116 and/or a public switched telephone network (PSTN) 118. A wireless communication network 120 is in communication with the PSTN 118 and includes a mobile base station 122. A mobile station 130 is in communication with the wireless network 120 and includes a display 135, a keypad 132, an audio output transducer 137, a microphone 134, a message processor 136, and a transceiver 138. As shown in FIG. 1A, a user of the mobile station 100 contacts the mobile station 130 via the wireless networks 116, 120 and the PSTN 118. In other examples, a mobile station user contacts a landline telephone, a personal computer or other computer, a personal digital assistant, a computer network, or other fixed or mobile destination associated with an intended recipient.

The wireless network 116 of FIG. 1A also includes a voice message processor 142 that is in communication with the wireless network 116. The voice message processor 142 is configured to, for example, store a voice message in a memory 144. The voice message processor 142 can also process a voice message either prior to or after storage to produce an associated text representation that can be stored in a memory 146. In addition, the voice processor 142 can be configured to produce a compact text representation for storage in a memory 148. A single memory can be used to store voice messages and associated text representations. In some examples, voice messages and text representations are not stored.

Voice message processors can also be provided at other communication system locations. The PSTN 118 can be configured to be in communication with a voice message processor 152 that includes a memory 154 configured to store voice messages and associated text representations and compact text representations produced by the voice message processor 152. The wireless network 120 can be configured to be in communication with a voice message processor 162 that is configured to store one or more voice messages in a memory 164 and associated text representations or compact text representations produced by the voice message processor 162. In other examples, a voice message processor is configured to produce and/or store a text representation or a compact text representation associated with a voice message produced or stored in a remote network.

Figure 1B:
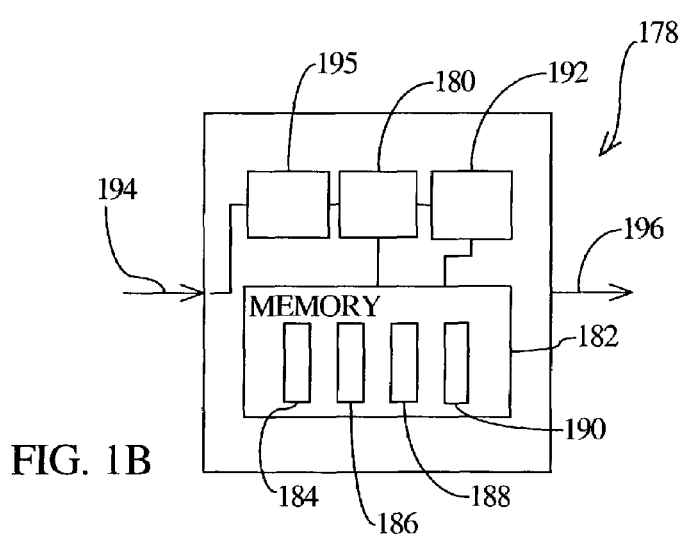
FIG. 1B is a schematic diagram of a voice message processor.

With reference to FIG. 1B, a voice processor 178 includes a controller 180, a memory 182 configured to store a standard abbreviation library 184 and user-customized abbreviation libraries 186, 188. The memory 182 is also configured to store a rule library 190 that includes one or more abbreviation rules. The memory 182 can also be configured to store computer executable instructions for an abbreviation processor 192. In some examples, the voice processor 178 is provided at a mobile base station or other network location in a wireless or wired network, but such a processor can also be provided at a subscriber location in, for example, a portable digital assistant, a personal computer, a server, a mobile station, a fixed station, or other device. The processor 178 can be a dedicated processor, or can be a processor associated with additional applications. For example, a central processing unit of a personal computer or server can be configured to provide such processing as well as processing for other applications. A voice message or other speech transmission from a mobile station or otherwise provided is received by the message processor 178 at an input 194 and is converted to text by a speech processor 195. The speech processor 195 typically produces a text representation of the received speech signal and stores the text representation in the memory 182 or transmits the text representation for storage elsewhere. The text representation can be abbreviated based on one or more of the abbreviation libraries 184, 186, 188 and the rule library 190 and stored as a compact representation in the memory 182. The text representation can be compared with text stored in one or more of the abbreviation libraries 184, 186, 188 or processed using classification methods based on fuzzy logic or neural networks or other methods using rules stored in the rule library 190. Abbreviation libraries and/or rule libraries can be configured based on message classes or profiles. For example, specific libraries can be associated with personal messages, business messages, family messages, technical messages, recreational messages, messages directed to international destinations, messages intended for non-English speakers, or other message categories. In some examples, more than one library can be selected. Such libraries can be configured to abbreviate based on, for example, words or phrases that are easily recognized within a selected classification. In addition, libraries can be configured for one or more languages so that language specific libraries are available. Messages in one or more languages can be appropriately shortened based on such libraries.

For example, abbreviation processing can be configured so that certain words are omitted. Vowels can be similarly identified for omission based on a rule stored in the rule library 190. As used herein, shortening of a text string is referred to as abbreviation. Thus, abbreviation includes shortening a text string by, for example, removal of vowels or other characters. The compact text representation and/or the full text representation can be stored and then delivered to an output 196. In addition, an identifier can be provided that indicates whether or not a source voice message remains available and/or indicates an extent of text compaction or other text processing.

The controller 180 can be arranged to provide user or hardware configurable abbreviation by, for example, selection of which abbreviation libraries or rule libraries are to be used, or to specify a target abbreviation extent. For example, messages that only slightly exceed typical display capabilities of display capabilities of a destination device or permitted message lengths can be only slightly abbreviated. Alternatively, messages may be extensively abbreviated between, for example, users who are accustomed to reading abbreviated messages. The extent of message abbreviation can be user selected or can be determined by the message processor based on message properties such as message length. Abbreviation extent can be conveniently selected based on a user-selectable abbreviation index.

Speech processing can be applied before or after transmission of voice messages to a recipient. A message recipient can recover speech by expanding the text representation or the compact representation with a speech processor. Alternatively, the voice message can be stored in voice mail, and recovered after review of the associated text representation or compact representation.

The message processor 178 can be configured so that messages are processed based on, for example, properties of the displays 105, 135, the identity of the message sender, or other message characteristics such as message length. For example, the message processor 178 can receive the voice message and produce a text representation without compaction if the display 135 has space available for the full text representation. If so, the message can be delivered in its original text form to the display 135. If adequate display space is unavailable, the message processor 136 can abbreviate the message based on the display space available. Thus, if the display 135 has considerable space available, only slight abbreviation can be applied by removing only a few characters or abbreviating words having easily recognized abbreviations, based on, for example, a user abbreviation configuration. In other examples, message abbreviation can be based on selected abbreviation or rule libraries that can be configured based on the identity of the message sender. For example, users can agree on abbreviation configurations to reduce ambiguities in abbreviated messages.

Message processing methods and systems as described above can also be configured to process text messages to produce associated voice messages. For example, email messages can be processed to produce speech signals. Compact email messages and other compact text messages can be expanded prior to speech conversion, or such compact messages can be expanded. So-called instant messaging applications can also include such text and speech processing so that instant messages can be received as voice messages. Speech processing can be associated with compact or expanded texts that are processed using, for example, abbreviation libraries configured based on instant message recipients or recipient groups such as "buddy lists." For example, a particular buddy list can be associated with appropriate abbreviation libraries and rules.

Display of an illustrative text representation and a corresponding compact text is illustrated in FIGS. 2A-2C. With reference to FIG. 2A, a mobile station 200 includes a keypad 202, a microphone 203, function keys 204, and a display 206. The mobile station 202 also includes an antenna, transceiver, an audio transducer, a message processor, and other features similar to those illustrated in FIG. 1A, but such features are not shown in FIGS. 2A-2C. The display 206 is configured to include a message area 208 and an area 210 that is configured to show information regarding current calls, a call log, or other information, and provide access to a mobile station menu. As shown in FIG. 2A, a text representation "JB WILL BE AT RESTAURANT ON PINE STREET NEAR FREEWAY EXIT" of a voice message is displayed in the message area 208. Unfortunately, this text representation uses a substantial portion of the message area 210 so that display of additional text representations or other text messages or device controls is limited. As shown in FIG. 2A, a display icon 211 is configured to indicate that the display text message is a text representation of a voice message, and that the voice message is available. A message identifier 214 is displayed so that a message recipient can select a corresponding voice mail message for retrieval or for text expansion or compaction. FIG. 2B illustrates the mobile station 200 configured to display a compact text representation 218 of the message of FIG. 2A as well as text representations or compact text representations of additional message 220, 222 that can be associated with voice messages, voice mail messages, short message service (SMS) messages, email messages, or other text of voice messages. As shown in FIG. 2B, the messages 218, 220, 222 are text representations of associated voice messages. Message icons 230 234 indicate that associated voice messages are available, while a message icon 232 indicates that an associated full text representation is available. Message identifiers 235, 236, 237 are also provide to aid in retrieval of associated voice or text messages.

In additional examples, text representations or other messages are displayed with associated identifiers so that the recipient can obtain compact text representations, corresponding voice mail messages, or other information pertaining to message content, message source, delivery time, size, or other message properties. For example, as shown in FIG. 2C, messages 240, 242, 244 and respective message identifiers 246, 248, 250 are shown on the display 206. The message 242 is associated with a display icon 252 that indicates that the message 242 is an email message. The message 244 is associated with a display icon 254 that indicates that the message 244 is a text representation of a voice message.

The mobile station 200 can be configured to communicate to other mobile stations or network elements that text representations of voice messages are requested. Incoming voice mail messages are then stored, and corresponding text representations, either full text representations or compact representations, can be automatically forwarded to the mobile station. Alternatively, the mobile station can indicate to, for example, to a network element such a mobile switching center, a base station controller, a home location register, or other network element or network node that voice messages are preferred and text messages can be processed to speech for delivery.

Compact text representations can be generated with or without user intervention. For example, the user can inspect a portion of a full text representation and then indicate that a compact representation is requested using one or more of the function keys 204. The compact text can be generated at, for example, the mobile station 200 or at a network node or other location. Alternatively, because, for example, the text representation exceeds a mobile station display capacity or a network service limit, a compact representation can be produced and delivered without user intervention. For example, messages using a so-called short message service (SMS) can include only 160 characters so that text representations longer than 160 characters can be automatically compacted for SMS delivery. The recipient can then select display of the full text representation of delivery of the voice mail message using one or more of the function keys 204. The full text representation can then be view using a scrolling operation.

Figure 3:
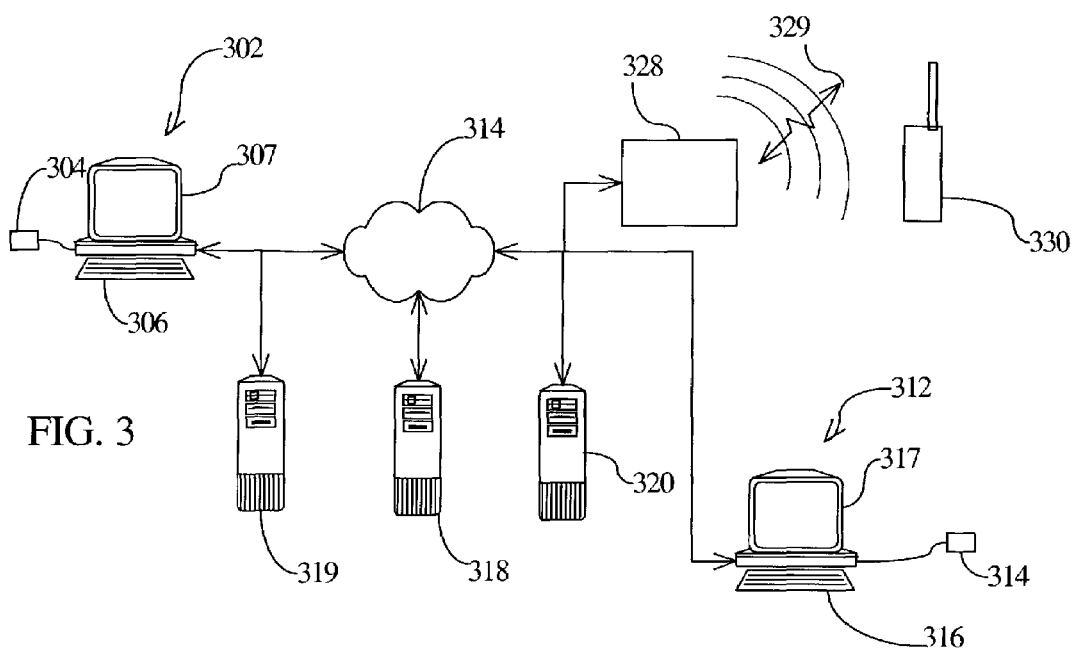
FIG. 3 is a schematic block diagram of a communication network that includes one or more voice message processors.

Voice message processing of messages produced at and delivered to other devices can be similarly configured. With reference to FIG. 3 a personal computer 302 or other computer system is configured to receive and process voice messages delivered from a voice input device 304 as a microphone. The personal computer 302 typically includes a microprocessor, random access memory, read only memory, one or more hard disk drives, a floppy disk drive, and other data storage devices and input/output devices. Voice messages are processed using speech recognition hardware and/or software associated with the personal computer 302. As shown in FIG. 3, the personal computer 302 includes a keyboard 306 and a display monitor 307 such as a cathode ray tube display, a liquid crystal display, or other display.

Voice messages or other voice inputs to the personal computer 302 can be delivered to a communication network 314 such as, for example, a wireless network or a public switched telephone network, or other communication network. Such voice messages can also be delivered to a server or other network element 319 that is configured to, for example, store voice messages or other voice inputs, and process such voice messages and inputs to produce corresponding text representations. In addition, the network element 319 can be configured to produce a voice representation based on a text message or text representation stored at the network element 319 or delivered to the network element 319 by the communication network 314 or the personal computer 302.

The communication network 314 can be configured to communicate with a network element 318 that can store voice messages, process voice messages, and store text representations or compact text representations associated with text messages. The processor 318 can deliver or receive such voice messages or text messages from one or more network elements such as the personal computer 302, a personal computer 312, or a mobile station 330 that is in communication with a wireless network 328 using an air interface 329. The network elements 318, 319, 320 can be configured to store and/or process voice messages and text representations. In some examples, the network elements are configured to process voice messages or text representations that are stored at remote locations such as other network elements. For example, the network element 319 can be configured to receive a voice message stored at the network elements 318 and process the voice message. The associated text representation can be stored at the network element 319 or at another location. A compact text representation can be obtained by processing the voice message or the associated text representation.

In some examples, text strings are processed for delivery as voice messages. For example, the personal computer 302 can be configured to receive text strings produced using the keyboard 306 and/or a mouse or other pointing device or input device. The text strings can be processed with word processor application software, presentation application software, graphics software, or other applications. Alternatively, text strings can be stored in a computer-readable medium in various formats. A text processor can be configured to deliver text strings as voice messages as well as a voice message identifier that indicates that the voice message is associated with a text string. The text string can be compacted before or after such processing, and the associated voice message can be reprocessed at other network locations to produce corresponding text representations or compact text representations. Full text representations and compact text representations can be stored based on a user or network selection.

Figure 4:
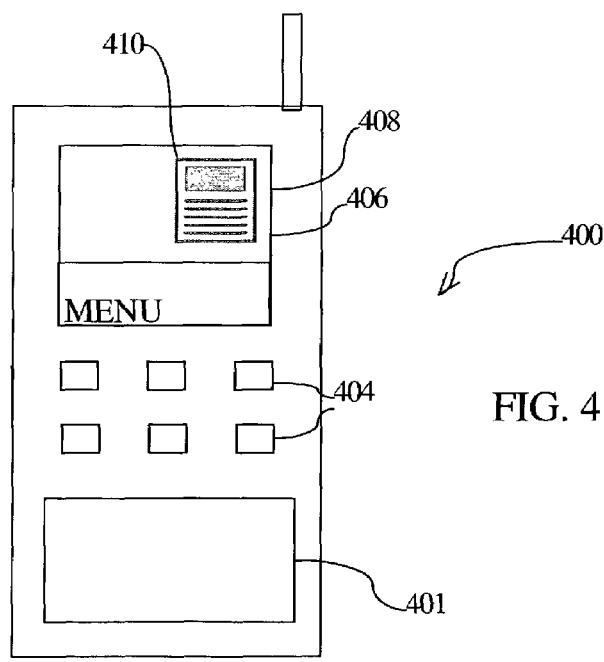
FIG. 4 is a schematic diagram of a mobile station configured to indicate availability of a text representation of a voice message.

With reference to FIG. 4, a mobile station 400 such as a cell phone, a personal digital assistant, or a laptop computer includes a keypad 401, function keys 404, and a display 406. The display 406 includes a message area 408 configured to display voice message or text message notifications and associated text messages and text representations. In addition, message area 408 is configured to display message identifiers or other parameters associated with various messages. As shown in FIG. 4, a text availability indicator 410 is displayed that is associated with a voice message that is delivered to the mobile station 400. The presence of the indicator 410 communicates to the message recipient that delivery of the associated text message can be requested. In addition, the indicator 410 can be used to identify voice messages that are derived from text messages.

Control of a voice message processing can be provided based on a menu or other user interface configured for selection of processor parameters. For example, a so-called "drop-down" menu can be provided that is associated with one or more voice processor functions such as abbreviation extent, library selection, abbreviation level selection, or toggling between full text representation and compact text representation. The menu can be displayed in response to a menu entry selection signal provided by a user selection device such as a mouse, keyboard, or the device. An execution signal associated with one or more voice processor functions can be provided based on a menu entry selected by a user.

Figure 5A:
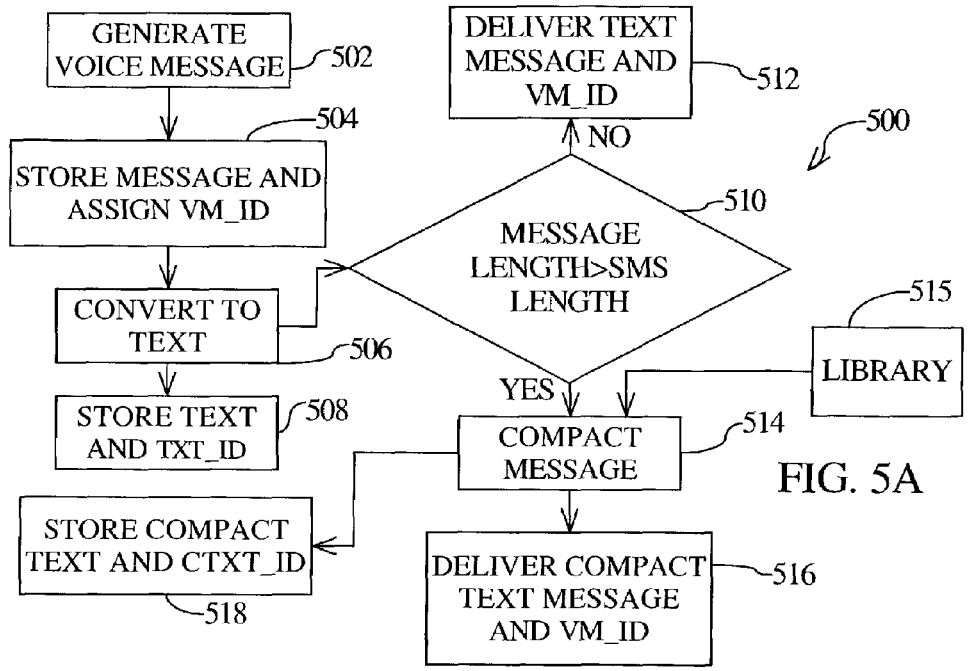
FIGS. 5A-5B are schematic block diagrams illustrating representative methods of processing a voice message.

A representative voice message processing method 500 is illustrated in FIG. 5A. In a step 502, a voice message is received for processing. In a step 504, the voice message is stored and a voice message identifier VM_ID is assigned. In a step 506, the voice message is processed based on one or more predetermined processing parameters. The processing parameters can be associated with, for example, display hardware properties, a degree of processing intended, availability of standard, custom, or shared abbreviation or rule libraries, and whether both full text and compact text representations as well as the voice message are to be stored. In a step 508, the text representation is stored along with an identifier TXT_ID that can indicate, for example, availability of the source voice message, parameters used for processing such as whether the text representation is a compact representation. In a step 510, a length of the text representation is compared with a message length associated with a Short Message Service (SMS) protocol. If the text representation length does not exceed the SMS message length, the text representation and the associated voice message identifier (VM_ID) are delivered to a recipient. If the text representation length exceeds the SMS length, the text representation can be further processed in a step 514 and delivered in a step 516. Typically, a compact representation is produced in the step 514 using a library 515 that includes, for example, a subscriber profile, destination identifiers such as mobile identification numbers (MIN), international mobile equipment identifiers (IMEI), electronic serial numbers (ESN), or international mobile subscriber identifiers (IMSI), other parameters. Computer readable media can be configured to include computer-executable instructions for such processing methods, or other applications that include such processing.

Figure 5B:
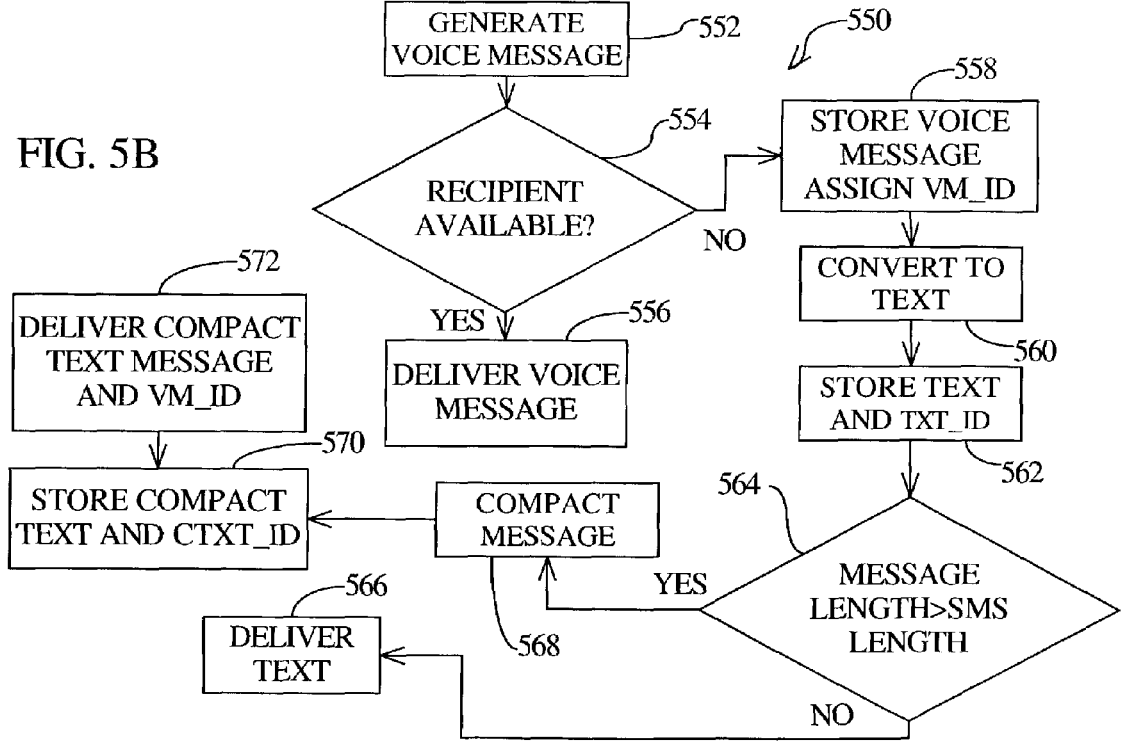

With reference to FIG. 5B, a method 550 includes generating a voice message in a step 552 and verifying recipient voice availability in a step 552. If a message recipient is available for delivery of voice messages, the voice message is delivered in a step 556. If the recipient is unavailable for voice delivery, the voice message is stored and a voice message identifier (VM_ID) assigned in a step 558, and the voice message is processed in step 560 to produce an associated text representation. In a step 562, the text representation and a text representation identifier TXT_ID are stored. In a step 564, a text representation length is compared with, for example, a short message service message length. If the text representation is no longer than the SMS length, the text representation is delivered in step 566. If the message length is greater than an SMS length, the text representation is compacted in a step 568. The compacted message and an associated identifier CTXT_ID are stored in a step 570, and the compact message is delivered in a step 572. Recipient availability can be established using recipient information stored at a mobile station or at one or more network elements or network nodes.

Voice message processing and production of text representations can be associated with a graphical user interface such that provided with a MICROSOFT WINDOWS operating system or other operating system. Generally such graphical user interfaces display an object on a display screen and a voice processing function is associated with the displayed object. For example, the displayed object can be associated with display of abbreviated text or full text, selection of abbreviation level, or selection or customization of one or more rule or abbreviation libraries. A user input based on the displayed object activates execution of such functions. In some examples, a menu of functions is displayed.

Figure 6:
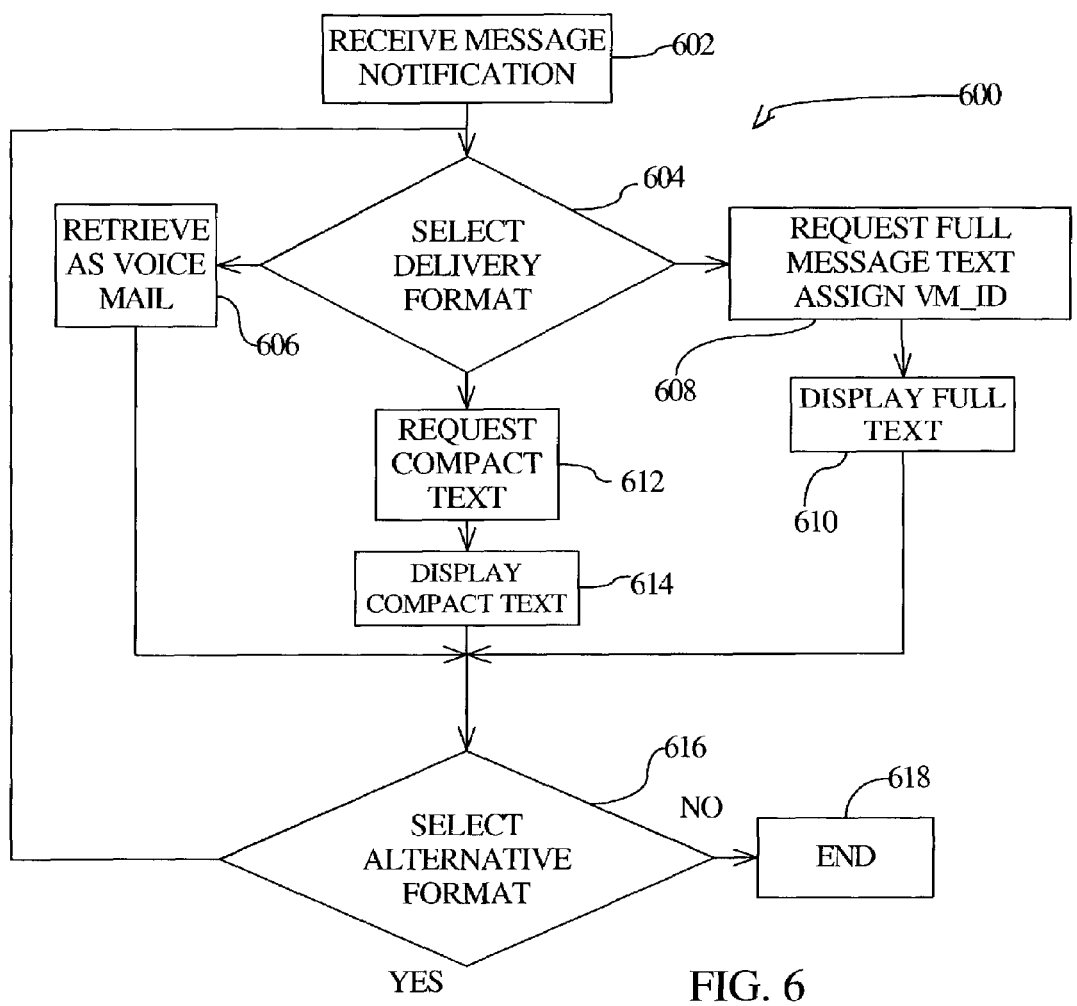
FIG. 6 is a schematic block diagram of a method of selecting a message format in response to a message notification.

With reference to FIG. 6, a method 600 of requesting a voice message or an associated text representation includes receiving a message notification in a step 602 and selecting a delivery format in a step 604. In a step 606, voice message delivery is requested and a voice message is retrieved or delivered. Alternatively, in a step 608, a text representation is requested and a voice message identifier VM_ID is assigned. In a step 610, a text representation is retrieved and displayed. In another alternative, a compact text representation can be requested in step 612 and displayed in a step 614. After receipt of a selected message format, an alternative format can be selected in a step 616. If no additional formats are requested, message delivery ends in a step 618.

Text representations including compact representations can be obtained by processing a voice message using an abbreviation personality library and/or an abbreviation parameter table that can be based on a sender identification, message length, abbreviation level, or other parameters. User personalities can be based on sender preferences, recipient preferences, hardware and/or software configuration in a mobile station or other device. For example, a user personality can be configured so that messages to selected recipients are abbreviated based on a private library. The user personality for such a personal library can provide identification of recipients to be associated with such a private user personality. The personal library can also include abbreviations for terms that common to group members, or abbreviation can be avoided for recipients for whom abbreviated messages pose difficulties. Messages to other recipients can be abbreviated based on generic abbreviation conditions, or only slightly abbreviated so that they are easily understood.

In other examples, voice message processing can be based on properties of network elements, network capacity, network congestion, or based on a subscriber service profile that indicates services available to a message originator or recipient. An abbreviation indicator can be associated with a compact text representation and transmitted to a recipient or another network element. If the abbreviation indicator is available to the recipient mobile station (or network element), text processing associated with the compact text representation can be reversed or partially reversed, either automatically based on an abbreviation personality associated with a network element, a recipient, communication equipment, or network capacity or capabilities. Alternatively, a recipient can request a less abbreviated version in order to confirm or clarify the received processed text. In addition, if messages are abbreviated to avoid network congestion, the recipient can request that unprocessed message text be delivered when network congestion is relieved. The abbreviation indicator can be associated with abbreviation extent or identify specific libraries used for text shortening.

It will be appreciated that the examples described above can be modified in arrangement and detail. For example, voice message processors can be associated with voice message origination, reception, or at locations between origination and reception. For example, a wireless network can include a voice message processor associated with a network messaging center. Based on network settings or configuration parameters supplied by a network subscriber, voice messages can processed or abbreviated for transmission to a recipient. Voice messages intended for a subscriber can be associated with compact text representations that are abbreviated based on configuration parameters stored at a user mobile station such as a cellular phone, a personal digital assistant, a palmtop computer, or other mobile device that communicates over an air interface. Alternatively voice message processor setting can be stored at a network message center or other network location. Voice message processors can be provided as computer-executable instructions for use with liquid crystal or other computer-based projection systems, laptop computers, handheld computers, or other devices. In addition, voice message processors can be configured to process text messages and produce associated voice messages.

In other examples, message sources and message receivers can be associated with wireless communication devices such as mobile stations, wireless personal digital assistants, personal computers and laptop computers that communicate via a wireless network, other computers that communicate via a wired network, or other devices. For example, a message source can be a personal computer that is configured to transmit a message that is intended for a recipient via an air interface. Alternatively, a mobile station can be configured to produce a voice message that is directed to a personal computer. Text processing can be provided at the personal computer, a network element of a wired or wireless portion of a network, a server, at a mobile station, or other location. In some examples, text processing can be provided at several locations. Abbreviation parameters can be stored locally or in a wired or wireless network, or entered manually. Processing identifiers can be communicated as one or more identification bits or identification words that are associated with processing extent and/or processing libraries, processing classes, or processing rules that are to be applied or that have been applied. In view of these representative examples, I claim all that is encompassed by the appended claims.

I claim:

1. A voice message processor, comprising:
an input configured to receive a voice message from a sender;
a speech signal processor configured to produce a text representation associated with the voice message;
a data structure configured to store a plurality of abbreviation libraries associated with one or more senders, the speech signal processor being configured to select at least one of the plurality of abbreviation libraries associated with the sender of the voice message, the selected at least one of the plurality of abbreviation libraries having at least one abbreviation associated with at least a portion of the text representation, the speech signal processor being further configured to produce a compact text representation by replacing the portion of the text representation with the at least one abbreviation associated therewith; and
an output configured to deliver the compact text representation to a mobile station.

2. The voice message processor of claim 1, wherein the text representation comprises a plurality of characters, the voice message processor further comprising a data structure configured to store a rule library having at least one rule instructing the speech signal processor how to abbreviate the text representation by removing at least a portion of the plurality of characters from the text representation, the speech signal processor being configured to produce the compact text representation by using the at least one rule to abbreviate the text representation.

3. The voice message processor of claim 1, wherein the speech signal processor is configured to assign a voice message identifier to the voice message and a compact text identifier to the compact text representation that are delivered to the mobile station.

4. The voice message processor of claim 1, wherein the text representation comprises a plurality of words, the voice message process further comprising a data structure configured to store a rule library having at least one rule instructing the speech signal processor to omit at least one word from the text representation, the speech signal processor being configured to produce the compact text representation by using the at least one rule to abbreviate the text representation.

5. The voice message processor of claim 1, wherein the text representation comprises a plurality of characters including at least one vowel, the voice message processor further comprising a data structure configured to store a rule library having at least one rule instructing the speech signal processor to abbreviate the text representation by removing the at least one vowel from the plurality of characters from the text representation, the speech signal processor being configured to produce the compact text representation by using the at least one rule to abbreviate the text representation.

6. A voice message processor, comprising:
means for receiving a voice message;
means for identifying a sender of the voice message;
means for selecting an abbreviation library associated with the sender of the voice message;
means for processing the voice message to produce an uncompacted text representation comprising a plurality of words;
means for using the selected abbreviation library to replace at least one of the plurality of words of the uncompacted text representation with an abbreviation of the at least one of the plurality of words thereby abbreviating the uncompacted text representation into a compacted text representation; and
means for selectively transmitting the compacted text representation to a mobile station.

7. A voice message processing method, comprising:
receiving a voice message;
identifying a sender of the voice message;
selecting an abbreviation library associated with the sender of the voice message;
producing a text representation of the voice message;
compacting the text representation using the selected abbreviation library to abbreviate the text representation thereby producing a compact text representation, the abbreviation library comprising an abbreviated representation for one or more portions of the text representation; and
delivering the compact text representation to a mobile station.

8. The voice message processing method of claim 7, further comprising storing the voice message and the text representation.

9. The method of claim 7, further comprising producing the compact text representation based on a rule library.

10. The voice message processing method of claim 7, further comprising displaying indicators associated with availability for delivery of the voice message and the compact text representation of the voice message.

11. The voice message processing method of claim 10, further comprising receiving a delivery format indication, and delivering the voice message or the compact text message or both to the mobile station based on the delivery format indication.

12. The voice message processing method of claim 11, wherein the delivery format is compacted text.

13. The voice message processing method of claim 11, wherein the delivery format is voice message.

14. A computer readable medium, comprising computer-executable instruction for:
receiving a voice message;
identifying a sender of the voice message;
selecting an abbreviation library associated with the sender of the voice message;
producing a text representation of the voice message;
compacting the text representation using the selected abbreviation library to abbreviate the text representation thereby producing a compact text representation, the abbreviation library comprising an abbreviated representation for one or more portions of the text representation; and
delivering the compact text representation to a mobile station.

15. The computer readable medium of claim 14, further comprising the abbreviation library.

16. A voice message processor comprising:
an input configured to receive a voice message belonging to a message class of a plurality of message classes;
a speech signal processor configured to produce a text representation associated with the voice message;
a data structure configured to store an abbreviation library for each of the plurality of message classes, the speech signal processor being configured to identify the abbreviation library for the message class to which the voice message belongs, the identified abbreviation library having at least one abbreviation associated with at least a portion of the text representation, the speech signal processor being further configured to produce a compact text representation by replacing the portion of the text representation with the at least one abbreviation associated therewith; and an output configured to deliver the compact text representation to a mobile station.

17. The voice message processor of claim 16, wherein the plurality of message classes comprise personal messages, business messages, family messages, technical messages, or recreational messages.

18. The voice message processor of claim 16, wherein the plurality of message classes comprise messages directed to international destinations, or messages sent to non-English speaking recipients.

19. A voice message processor comprising:
an input configured to receive a voice message associated with a message profile of a plurality of message profiles,
a speech signal processor configured to produce a text representation associated with the voice message;
a data structure configured to store an abbreviation library for each message profile of the plurality of message profiles, the speech signal processor being configured to identify the abbreviation library for the message profile associated with the voice message, the identified abbreviation library having at least one abbreviation associated with at least a portion of the text representation, the speech signal processor being further configured to produce a compact text representation by replacing the portion of the text representation with the at least one abbreviation associated therewith; and
an output configured to deliver the compact text representation to a mobile station.

20. A voice message processor, comprising:
an input configured to receive a voice message associated with a user;
a speech signal processor configured to produce a text representation associated with the voice message;
a memory configured to store a plurality of abbreviation libraries each associated with a different user, the speech signal processor being configured to select one of the plurality of abbreviation libraries associated with the same user associated with the voice message, the selected one of the plurality of abbreviation libraries having at least one abbreviation associated with at least a portion of the text representation, the speech signal processor being further configured to produce a compact text representation by replacing the at least a portion of the text representation with the at least one abbreviation associated therewith; and
an output configured to deliver the compact text representation to a mobile station.

21. The voice message processor of claim 20, wherein the text representation comprises a plurality of characters,
the memory is further configured to store a rule library having at least one rule instructing the speech signal processor how to abbreviate the text representation by removing at least a portion of the plurality of characters from the text representation, and
the speech signal processor is configured to produce the compact text representation by using the at least one rule to abbreviate the text representation.

22. The voice message processor of claim 20, wherein the speech signal processor is configured to produce the compact text representation only if the text representation is longer than a short message service (SMS) message length.

* * * * *